US010133024B2

(12) United States Patent
Liermann et al.

(10) Patent No.: US 10,133,024 B2
(45) Date of Patent: Nov. 20, 2018

(54) OPTICAL ELEMENT HOLDING DEVICE FOR ADJUSTING AN OPTICAL ELEMENT

(71) Applicant: TRUMPF LASER GMBH, Schramberg (DE)

(72) Inventors: Martin Liermann, Villingen Schwenningen (DE); Manuel Wolf, Schramberg (DE); Jochen Doerner, Shiltach (DE); Sarah Hilarius, Freudenstadt (DE); Walter de Wall, Aichhalden (DE)

(73) Assignee: TRUMPF LASER GMBH, Schramberg (DE)

( * ) Notice: Subject to any disclaimer, the term of this patent is extended or adjusted under 35 U.S.C. 154(b) by 264 days.

(21) Appl. No.: 15/130,275

(22) Filed: Apr. 15, 2016

(65) Prior Publication Data

US 2016/0231530 A1 Aug. 11, 2016

Related U.S. Application Data

(63) Continuation of application No. PCT/EP2014/071607, filed on Oct. 9, 2014.

(30) Foreign Application Priority Data

Oct. 17, 2013 (DE) ........................ 10 2013 221 044

(51) Int. Cl.
*G02B 7/182* (2006.01)
*G02B 7/00* (2006.01)
*G02B 7/02* (2006.01)

(52) U.S. Cl.
CPC ............ *G02B 7/182* (2013.01); *G02B 7/004* (2013.01); *G02B 7/023* (2013.01); *G02B 7/1825* (2013.01)

(58) Field of Classification Search
CPC .... G02B 7/1825; G02B 7/182; G02B 7/1821; G02B 7/1822; G02B 7/1824; G02B 7/023; G02B 7/003; G02B 7/004
(Continued)

(56) References Cited

U.S. PATENT DOCUMENTS 3,407,018 A 10/1968 Miller
5,400,184 A * 3/1995 Kuklo ................. G02B 7/1827 248/476

(Continued)

FOREIGN PATENT DOCUMENTS

DE 10 2009 025 309 12/2010
JP 10206713 8/1998

OTHER PUBLICATIONS

Notification of Transmittal of Translation of the International Preliminary Report on Patentability and the Written Opinion of the International Searching Authority for corresponding PCT Application No. PCT/EP2014/071607, dated Apr. 26, 2016, 12 pages.

(Continued)

*Primary Examiner* — Marin Pichler
(74) *Attorney, Agent, or Firm* — Fish & Richardson P.C.

(57) ABSTRACT

An optical element holding device adjusts an optical element about a first and second axis and includes a main support, and a first plate-shaped support mounted on the main support via a first flexure bearing. The first support can pivot about the first axis. A second support is mounted on the first support via a second flexure bearing and can pivot about the second axis and fasten to the optical element. A first and second actuating element are actuated from a same side of the optical element holding device. A transmission device connected to the first and the second supports transmits the second actuating element movement acting on the transmission device into a pivoting movement of the second support about the second axis. The pivoting positions of the first and (Continued)

1 2 4 20 26 9 10 25 12 14 21 22 11 24 23 8 7 19 3 16 15 27 17 18 13 5 second supports can be set by the actuating elements and the second axis is oriented substantially perpendicularly to the plate-shaped first support.

16 Claims, 3 Drawing Sheets

(58) Field of Classification Search
USPC ......................... 359/872–874, 876, 819, 822
See application file for complete search history.

(56) References Cited

U.S. PATENT DOCUMENTS

| | | | | |
|---|---|---|---|---|
| 9,323,025 | B2 | 4/2016 | Heidemann et al. | |
| 2003/0035229 | A1 | 2/2003 | Willis | |
| 2005/0178934 | A1* | 8/2005 | Hacker | G01M 11/04 248/176.1 |
| 2013/0242419 | A1* | 9/2013 | Hopkins | G02B 7/004 359/819 |

OTHER PUBLICATIONS

International Search Report from corresponding PCT Application No. PCT/EP2014/071607, dated Feb. 4, 2015, 4 pages.

* cited by examiner

OPTICAL ELEMENT HOLDING DEVICE FOR ADJUSTING AN OPTICAL ELEMENT

CROSS-REFERENCE TO RELATED APPLICATIONS

This application is a continuation of and claims priority under 35 U.S.C. § 120 to PCT Application No. PCT/EP2014/071607 filed on Oct. 9, 2014, which claims priority to German Application No. DE 10 2013 221 044.2 filed on Oct. 17, 2013. The contents of both of these priority applications are hereby incorporated by reference in their entireties.

TECHNICAL FIELD

The present invention relates to optical element holding devices.

BACKGROUND

In the case of the optical element holding device known from JP10206713 a plate-shaped first support can be pivoted with respect to a main support, which for example is oriented horizontally in the installed position, about the first axis, which then likewise extends horizontally. A second support is also pivotable with respect to the first support about a second axis, where the second axis is oriented parallel to the plate-shaped first support and thus likewise substantially horizontally. In the case of this optical element holding device a first and second actuating element for setting the respective pivoting positions are typically actuated perpendicularly to the plate-shaped first support, i.e. from above or from a vertical direction in the installed position.

SUMMARY

The present disclosure provides optical element holding devices that provide the possibility of setting a pivoting position of an optical element not only about axes oriented substantially parallel to a plate-shaped first support (e.g., about horizontal axes), but additionally also setting the pivoting position about an axis extending perpendicularly to this support (e.g., a vertical axis), wherein it should be further possible to set the pivoting position of the support from the same side of the optical element holding device (e.g., from above).

As described herein, an optical element holding device has a second axis oriented substantially perpendicularly to the plate-shaped first support, and a transmission device is connected to the first and the second support to transmit an actuating movement of a second actuating element acting on the transmission device into a pivoting movement of a second support about a second axis.

By contrast with conventional optical element holding devices, the second axis is oriented perpendicularly and not parallel to the plate-shaped first support, so that actuating elements can still be actuated from the same side of the optical element holding device (generally from the upper side of the optical element holding device) to adjust the optical element. This arrangement makes it possible to position the optical element holding device at points of an apparatus (e.g., at a laser resonator) that are relatively difficult to access, and provides an overall compact design. The one-sided accessibility for adjustment of the optical element can also have an advantageous effect on the apparatus in question, for example the laser resonator. The optical element can additionally be adjusted or set highly precisely and quickly about the first and second axis by the optical element holding device. This is the case in particular since the pivoting and/or tilting movements are performed without play, friction and wear on account due to the flexure bearings.

The first support is plate-shaped, i.e., it has at least one support part with a comparatively low vertical extent in relation to the longitudinal and transverse extent. Here, the basic outline of the first support or support part (the extension in the longitudinal and transverse directions), can be arbitrary (e.g., square or rectangular). The first support can also have superstructures or the like arranged on the support part, which extend locally in the vertical direction (for example the second flexure bearing). The substantially perpendicular orientation of the second axis is understood to mean an orientation which also includes deviations of the second axis from the exactly right-angled course of +/−10°. The second axis oriented perpendicularly to the plate-shaped support stands at right angles on a plane through the plate-shaped support or through the support part having the comparatively short vertical extension in relation to the longitudinal and transverse extension. This plane is typically a longitudinal or transverse plane, e.g., a longitudinal center plane or a transverse center plane, and can contain the first axis or can be oriented parallel to the first axis. The first and the second support thus form what are known as wobble plates. The first support and the main plate in a neutral starting position are arranged or stacked typically in a stack direction adjacently, e.g., one above the other. The second axis extends substantially parallel to the stack direction.

The first actuating element mechanically cooperates with the main support and the first support to transmit the actuating movement of the first actuating element. For cooperation or to set the pivoting position of the first support with respect to the main support, the first actuating element can be movably mounted (e.g., between the first support and the main support) in such a way that an actuating movement of the first actuating element in a first direction pushes the first support away from the main support at one end and in so doing pivots the first support about the first flexure bearing. With an opposite actuating movement of the first actuating element (in a second direction opposite the first direction), the first support is pivoted back again by the first actuating element. For this purpose, the first actuating element can be mounted rotatably (for example on the main support) and can at least partially push away, spread, retract, or pivot the first support by a rotating collar on the first actuating element or by an inclined surface on the first actuating element. The first actuating element can alternatively also be mounted on the first support such that the first actuating element can perform a relative movement, and can be supported against the main support to perform the corresponding pivoting movements. The second actuating element mechanically cooperates with the transmission device in such a way that the transmission device is moved by the actuating movement of the second actuating element. The optical element to be adjusted can be a mirror, a prism, or the like. The optical element can be a reflective optical element, such as a mirror, or a transmissive optical element, such as a lens element, for a laser beam which can impinge in free beam propagation.

The flexure bearings can be made of the same material or materials of the rest of the elements of the optical element holder, e.g., metals such as high-strength aluminum, and are designed to enable a pivoting or a tilting of the respective elements relative to one another (e.g., a pivoting of the first support with respect to the main support or a pivoting of the second support with respect to the first support), and allow motion by bending a load element. The flexure bearings, which are typically flexible thin points have dimensions and mechanical properties (bending strength, etc.) selected such that a high service life or a sufficiently high number of pivoting or tilting movements without component failure is possible. Flexure bearings of this type are therefore advantageously free from wear and hysteresis.

In some embodiments of the optical element holding device the transmission device is connected via a third and fourth flexure bearing to the first and the second support. In this way, not only are the pivoting movements of the first and second support provided via flexure bearings, but also the connections of the transmission device to the first and second supports. Transmission movements of the transmission device, such as pivoting and/or tilting movements, can thus be performed without play, friction and wear, such that the optical element can be adjusted particularly precisely and quickly. The third flexure bearing connects the first support to the transmission device and the fourth flexure bearing connects the second support to the transmission device.

In further embodiments of the optical element holding device, the transmission device comprises a plurality of further flexure bearings. Due to the plurality of further flexure bearings, the actuating movement of the second actuating element can be transmitted without play and consequently very precisely to the second support. Advantageously high setting accuracies can be obtained. The optical element holding device can be constructed exclusively from flexure bearings, e.g., the optical element holding device exclusively has flexure bearings to perform all pivoting or tilting movements and is thus constructed substantially from identical parts and can be manufactured with relatively low outlay. This also reduces the assembly time and the assembly costs in the production of the optical element holding device. The plurality of further flexure bearings typically have axes oriented orthogonally to one another.

An embodiment in which the second actuating element mechanically cooperates with the first support and the transmission device to transmit the actuating movement is also possible. For cooperation with the first support and the transmission device, the second actuating element can be mounted movably for example between the first support and the transmission device. An actuating movement of the second actuating element (in a first direction) pushes the transmission device at least partially away from the first support (or tilts the transmission device about the third flexure bearing), and in such a way that a reverse actuating movement of the second actuating element (in a second direction, which is opposite the first direction) retracts the transmission device at least partially to the first support (or tilts the transmission device about the third flexure bearing in the opposite direction). For this purpose, the second actuating element can be mounted rotatably, for example, on the first support and can at least partially push away, spread, retract or tilt the transmission device by a rotating collar on the second actuating element or by an inclined surface on the second actuating element. The second actuating element can alternatively also be mounted on part of the transmission device such that the second actuating element can perform a relative movement, and can be supported against the first support to perform the corresponding pivoting movements.

In further embodiments, the transmission device comprises a lever element and a coupling element connected thereto. The lever element can be tilted about a third axis via a third flexure bearing, and the coupling element transmits the tilting movement of the lever element into the pivoting movement of the second support via the fourth flexure bearing. Due to the tiltable mounting of the lever element about the third flexure bearing, the actuating movement of the second actuating element can be transmitted firstly into a tilting movement of the lever element. Should the tilting movement direction of the lever element not coincide with the pivoting movement direction of the second support about the second axis, the coupling element transmits the tilting movement of the lever element onto the second support. The coupling element is for this purpose arranged between the lever element and the second support. The tilt axis of the third flexure bearing is typically oriented parallel to the first axis of the first flexure bearing. The lever element is rotatably connected to the coupling element, e.g., via a flexure bearing.

In further embodiments the coupling element comprises a plurality of flexure bearings coupled to one another and having axes oriented e.g., orthogonally to one another. Due to the plurality of flexure bearings coupled to one another, the tilting movement of the lever element can be transmitted without play and consequently with high precision to the second support. The optical element holding device then also exclusively has flexure bearings for performing all pivoting movements and tilting movements and can therefore be manufactured with comparatively low outlay.

In some embodiments the second actuating element is mounted on the lever element at a distance from the third flexure bearing such that it can perform a relative movement and can be supported at one end against the first support. In this way, the lever element can be tilted about the third flexure bearing by actuation of the second actuating element, e.g., via the actuating movement of the second actuating element. Since the lever element is typically arranged on the same side of the plate-shaped first support as the first actuating element, the second actuating element is also more directly accessible due to its mounting on the lever element. In other words, the second actuating element can thus be actuated more easily from this side of the optical element holding device (typically from above).

A spring element resetting the tilting movement of the lever element is also typically arranged between the lever element and the first support. The resetting spring element (for example a spiral spring fastened at one end to the lever element and at the other end to the first support) transmits the tilting movement (about the axis of the third flexure bearing) to the lever element firstly by actuation of the second actuating element in a first direction and can be reset again by actuating the second actuating element in the direction opposite to the first direction. The lever element in this way can be tilted not only in a first direction, but also back in the second opposite direction whereby the second support can also be indirectly pivoted not only in a first direction about the second axis, but can also be pivoted back accordingly in the second direction. A correcting fine adjustment of the optical element arranged on the second support is thus possible about the second axis by pivoting the second support back and forth. Due to the provision of a spring element, it is also possible to dispense with a prestressing of the lever element with respect to the first support element. This is particularly advantageous with comparatively small overall dimensions of the lever element and of the first support.

An embodiment in which the first support is prestressed relative to the main support is also possible. Due to the prestress, a pivoting movement generated initially by an actuation of the first actuating element in a first direction about the first axis can be reset again by actuation of the first actuating element in the opposite direction. The first support therefore can be pivoted not only in one direction, but also can be pivoted back in the opposite direction. Here, the first support is prestressed in particular relative to the main support in respect of a stress-free starting position in the pivoting direction. Similarly, it is also possible for the second support to be prestressed relative to the first support in this way (with respect to a stress-free starting position in the pivoting direction). The prestress can be selected in such a way that the first support is pivoted relative to the main support or in such a way that the second support is pivoted relative to the first support into a middle position through approximately 5°, e.g., through 1°-2° with respect to the stress-free starting position. A pivoting from the middle position through approximately +/−1°, e.g., through approximately +/−0.5°, is then possible for fine adjustment. In principle, the first support can be prestressed relative to the main support and/or the second support can be prestressed relative to the first support in the first direction or in the opposite, second direction.

In other embodiments the first and/or the second actuating element are each a ball pressure screw having a fine-pitch thread. Ball pressure screws having a fine-pitch thread enable a high actuation accuracy and are wear-free to the greatest possible extent. The first and/or the second actuating element are/is particularly preferably as differential screw(s). Differential screws offer a particularly high actuation accuracy and are likewise wear-free to the greatest possible extent. The longitudinal axes of the screws, in particular the longitudinal axis of the screw of the first actuating element, are oriented substantially parallel to the second axis (or perpendicularly to the plate-shaped first support).

In some embodiments the optical element holding device is formed monolithically, in particular as an aluminum milled part. Due to the monolithic formation the number of individual parts of the optical element holding device is heavily reduced. This in turn reduces the assembly time and the assembly costs in the production of the optical element holding device. Alternatively to the monolithic embodiment, the optical element holding device can be joined together from individual parts, e.g. individual parts adhesively bonded and/or screwed to one another. Monolithic optical element holding devices formed as milled parts are additionally high-strength parts and consequently are particularly robust. High-strength aluminum is particularly suitable as material for a milled part, since it can be easily worked and has a high deformability alongside high strength.

In some embodiments there are predetermined breaking points between the supports or lever elements that can be pivoted and/or tilted relative to one another. The predetermined breaking points can initially remain intact or unbroken, following the production of the optical element holding device, e.g. following the milling of the optical element holding device from a monolithic aluminum block, and can only be broken just before use thereof to enable the pivoting or tilting movements and therefore the adjustment. The optical element holding device is in this way particularly stable and therefore robust in the period of time between manufacture thereof and first use thereof. Accidental damage is therefore less likely. A predetermined breaking point is understood to mean a point of attachment or support that is typically a thinner structure compared with the rest of the surrounding structure. Attachment or support points of this type stabilize the structural cohesion of the optical element holding device, but can be separated or broken manually or by manually operable tools.

The optical element can be fastened to the second support in any way. The optical element can be fastened to the second support only on one side to rule out mechanical stresses, which would act on the optical element for example in the case of a two-sided fastening.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

Figure 1:
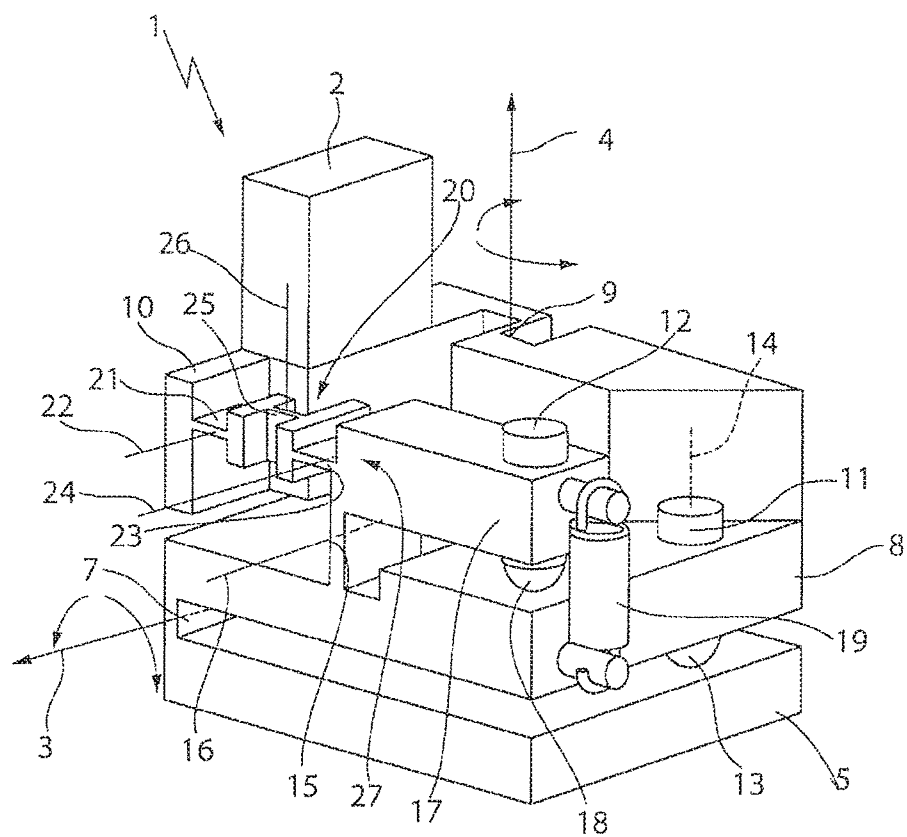
FIG. 1 a schematic diagram of an embodiment of an optical element holding device in a first perspective view.
Figure 2:
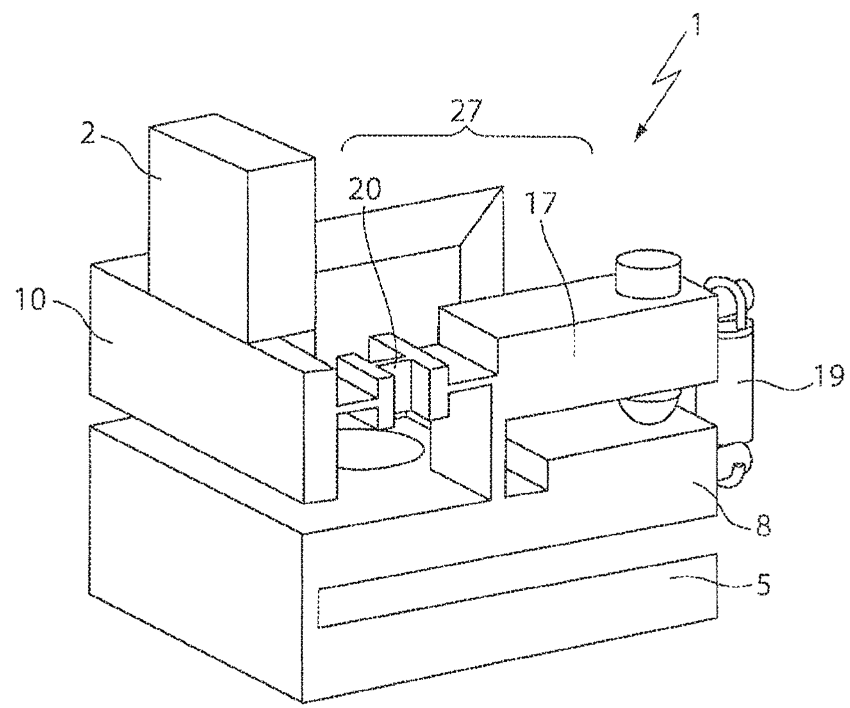
FIG. 2 is a further perspective view of the optical element holding device of FIG. 1.

FIGS. 1 to 4 show an optical element holding device 1 for adjusting an optical element 2 (e.g., a mirror) about two axes 3, 4 oriented at right angles to one another. The optical element holding device 1 has a main support 5 for fastening the optical element holding device 1 to another component such as a mounting flange (not illustrated). The optical element holding device 1 also has a largely plate-shaped first support 8 mounted on the main support 5 via a first flexure bearing 7 such that it can pivot about the first axis 3 by a value B1 (shown in FIG. 3). A second support 10 is mounted on the first support 8 via a second flexure bearing 9 (which connects to an upright portion of the largely plate-shaped first support 8) also has an upright portion such that it can pivot about the second axis 4 by a value B2 (shown in FIG. 4). The optical element 2 is fastened to the second support 10 such that it is involved in the corresponding pivoting movements of the first and second supports 8, 10. The optical element 2 is fastened to the second support 10 only on one side to minimize mechanical stresses caused by fastening.

Figure 3:
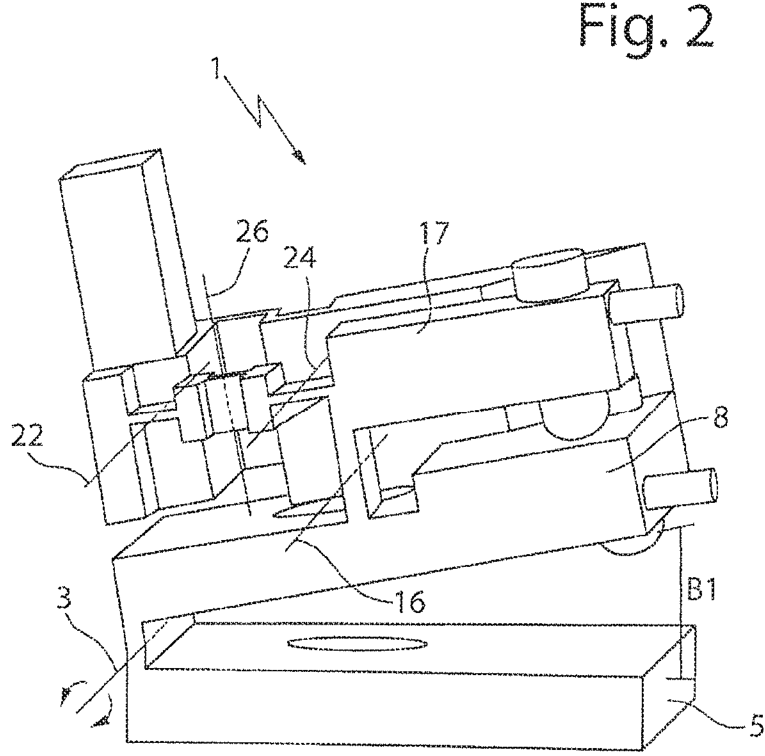
FIG. 3 is a schematic diagram of the optical element holding device of FIGS. 1 and 2 with a first support pivoted about a first axis.

The pivoting positions of the first and second support 8, 10 can be set by a first and a second actuating element 11, 12, which are ball pressure screws having a fine-pitch thread and which can each be actuated from the same side of the optical element holding device 1 (from above in the drawings) e.g., by a hex key. To set the pivoting position of the first support 8 relative to the main support 5, the first actuating element 11 is mounted rotatably in a threaded bore on the first support 8 and supported via its spherical end 13 on the main support 5. The first support 8 pivots about the first axis 3 against a resilient resetting force of the first flexure bearing 7 or against a prestress prevailing between the first support 8 and the main support 5 by actuation of the first actuating element 11, e.g., by screwing the first actuating element 11 into the threaded bore, until it assumes a pivoted position such as illustrated in FIG. 3. The first support 8 can be pivoted back about the first axis 3 by actuation of the first actuating element 11 in the opposite direction, e.g. by unscrewing the first actuating element 11 from the threaded bore, until reaching the position illustrated in FIGS. 1 and 2. The longitudinal axis 14 of the threaded bore or of the first actuating element 11 is oriented in this position parallel to the second axis 4. The second axis 4 is oriented perpendicularly to the plate-shaped first support 8.

The optical element holding device 1 also has a lever element 17 mounted tiltably about a third axis 16 via a third flexure bearing 15. The third flexure bearing 15 is arranged on the first support 8 in a manner radially distant from the second axis 4. The second actuating element 12 is mounted rotatably on the lever element 17 in a threaded bore in a manner distanced from the third flexure bearing 15 and is supported via its spherical end 18 on the first support 8. A spring element 19 (illustrated in FIGS. 1 and 2, but not in FIGS. 3 and 4) resets the tilting movement of the lever element 17 and is a spiral spring arranged between the lever element 17 and the first support 8. The lever element 17 is tilted about the third axis 16 against the resetting force of the spring element 19 by actuation of the second actuating element 12, e.g., by screwing the second actuating element 12 into the threaded bore until reaching a tilted position such as in FIG. 4. Upon actuation of the second actuating element 12 in the opposite direction, e.g. with unscrewing the second actuating element 12 from the threaded bore, the lever element 17 is tilted back increasingly about the third axis 16. A tilting movement of the lever element 17 about the third axis 16 can be generated in this way by actuation of the second actuating element 12.

The optical element holding device 1 additionally has a coupling element 20 coupling or interconnecting the second support 10 and the lever element 17. The coupling element is connected at one end via a fourth flexure bearing 21 to the second support 10 such that it can tilt about a fourth axis 22 and is connected at the other end to the lever element 17 via a fifth flexure bearing 23 such that it can tilt about a fifth axis 24. The fifth axis 24 is oriented parallel to the third and first axes 16, 3, and is at a distance A (shown in FIG. 4) from the third axis 16. The coupling element 20 lastly has a further, sixth flexure bearing 25 having a sixth axis 26, which is in turn oriented orthogonally to the fourth and fifth axes 22, 24 (as shown in FIG. 1).

The coupling element 20 and the lever element 17 together form a transmission device 27 connected to the first and second supports 8, 10 via the third and the fourth flexure bearings 15, 21 respectively. The transmission device 27 transmits an actuating movement of the second actuating element 12 acting on the transmission device 27 into a pivoting movement of the second support 10 about the second axis 4. To transmit this actuating movement, the second actuating element 12 cooperates with the first support 8 and the transmission device 27 (the second actuating element 12 is rotatably mounted in the further threaded bore and is supported via its spherical end 18 on the first support 8). That is, the movement of the second actuating element 12 acts in series with the movements of the first support 8 and the transmission device 12 to pivot the second support 10 about the second axis 4.

As already described, an actuating movement of the second actuating element 12 (e.g. a screwing or unscrewing of the second actuating element 12 into/from the threaded bore of lever element 17) causes the tilting movement of the lever element 17 about the third axis 16. To pivot the second support 10 about the second axis 4, the tilting movement of the lever element 17 (the circular movement of the fifth flexure bearing 23 about the third axis 16 with radius A), is transmitted to the pivoting movement of the second support 10, (to the circular movement of the fourth flexure bearing 21 about the second axis 4). For this purpose, the coupling element 20 is provided between the second support 10 and the lever element 17.

Figure 4:
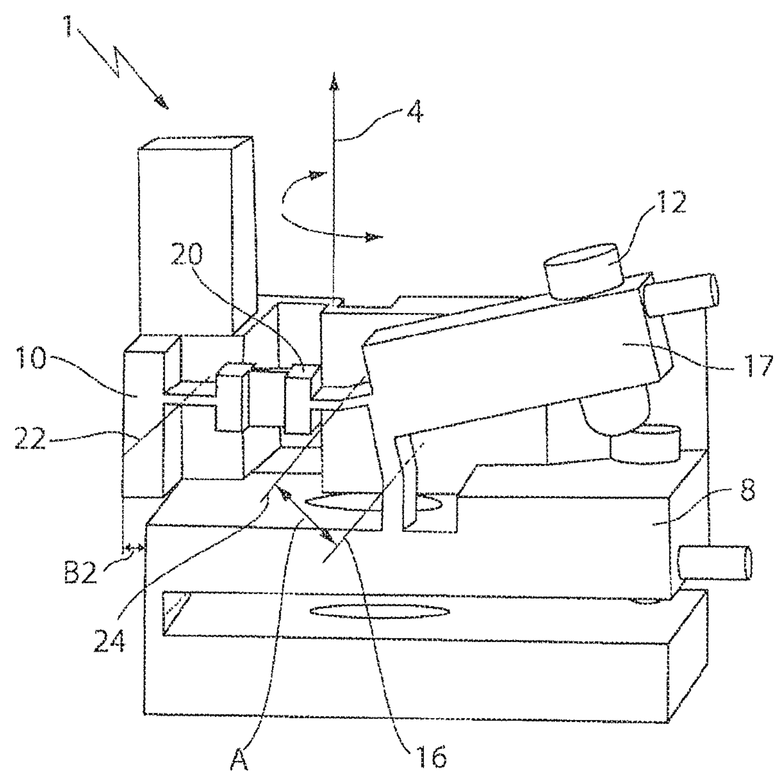
FIG. 4 is a schematic diagram that shows the optical element holding device of FIGS. 1 to 3 with a second support pivoted about a second axis and a lever element tilted about a third axis.

Depending on the current pivoting position of the second support 10, the sixth axis 26 or the sixth flexure bearing 25 of the coupling element 20 enables the fourth and fifth axes 22, 24 to be oriented parallel to one another (see pivoting position of the second support 10 and axis directions in FIG. 1), or enables the fourth and fifth axes 22, 24 to be pivoted slightly relative to one another (see pivoting position of the second support 10 and axis directions in FIG. 4). On the other hand, the fourth and fifth axes 22, 24 or the fourth and fifth flexure bearings 21, 23 enable the coupling element 20 to be tilted slightly about the fourth axis 22, depending on the current tilting position of the lever element 17 (the vertical position of the fifth axis 24 varies compared with the constant vertical position of the fourth axis 22 due to the tilting movement of the lever element 17). Consequently, the tilting movement of the lever element 17 is transmitted by the coupling element 20 into the pivoting movement of the second support 10, inter alia via the fourth flexure bearing 21.

The optical element holding device 1 with its transmission device 27 makes it possible to actuate the first and the second actuating element 11, 12 from the same side, although the second axis 4 is oriented perpendicularly to the plate-shaped first support 8. The actuating directions of the first and second actuating elements 11, 12, e.g., the directions from which actuating tools, such as a hex socket, are positioned and actuated, extend substantially parallel to the second axis 4 or substantially perpendicularly to the plate-shaped first support 8. The actuating direction of the actuating movement of the second actuating element 12 is deflected by approximately 90° onto the second support 10 by the transmission device 27. In this way, the optical element 2 can be adjusted or set about the first and second axes 3, 4. Since the optical element holding device 1 has exclusively flexure bearings 7, 9, 15, 21, 23, 25, all pivoting and/or tilting movements are without play and consequently highly precise.

Figure 5:
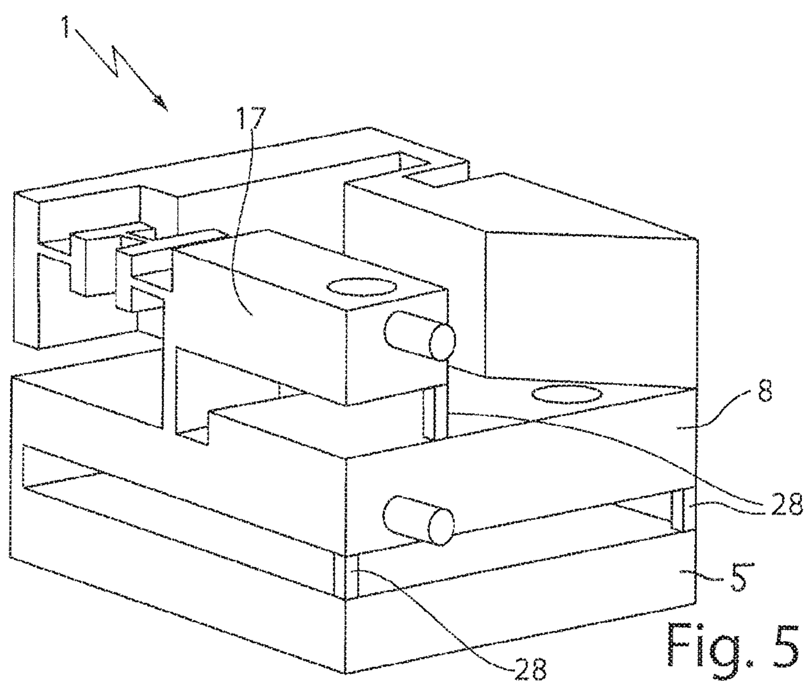
FIG. 5 is a schematic diagram of the optical element holding device with predetermined breaking points between supports and the lever element after being milled as a monolithic part.

In FIG. 5 the optical element holding device 1 is illustrated in a state directly following production thereof as a monolithic milled part. There are predetermined breaking points 28 between the first support 8 and the main support 5 and also between the first support 8 and the lever element 17 which stabilize the position of the supports 5, 8 relative to one another and the position of the lever element 17 with respect to the first support 8 until separation of the respective predetermined breaking points 28. The predetermined breaking points 28 can be destroyed or separated just before the use of the optical element holding device 1 so as to enable a pivoting of the respective parts 5, 8, 17 relative to one another.

Instead of being a reflective optical element such as a mirror for a laser beam impinging in free beam propagation, the optical element 2 can also be a transmissive optical element, for example a lens for a laser beam impinging in free beam propagation.

A number of embodiments of the invention have been described. Nevertheless, it will be understood that various modifications may be made without departing from the spirit and scope of the invention. Accordingly, other embodiments are within the scope of the following claims.

What is claimed is:

1. An optical element holding device for holding and adjusting an optical element about a first axis and a second axis located at a right angle to the first axis, the optical element holding device comprising:

a main support for fastening the optical element holding device;

a first plate-shaped support mounted on the main support via a first flexure bearing such that the first plate-shaped support can pivot about the first axis;

a second support mounted on the first support via a second flexure bearing such that the second support can pivot about the second axis and such that the second support fastens to the optical element;

a first actuating element and a second actuating element which are both actuated from a same side of the optical element holding device, wherein the actuating direction of the first actuating element is orthogonal to the first axis and the actuating direction of the second actuating element is parallel to the second axis; and a transmission device connected to the first support and the second support to transmit an actuating movement of the second actuating element acting on the transmission device into a pivoting movement of the second support about the second axis, wherein the pivoting positions of the first and second supports can be set by the first actuating element and second actuating element, respectively, and wherein the second axis is oriented substantially perpendicularly to the plate-shaped first support.

2. The optical element holding device of claim 1, wherein the transmission device comprises further flexure bearings.

3. The optical element holding device claim 1, wherein the second actuating element cooperates with the first support and the transmission device to transmit the actuating movement.

4. The optical element holding device of claim 1, wherein the transmission device is connected via a third and a fourth flexure bearing to the first and the second supports.

5. The optical element holding device of claim 4, wherein the transmission device comprises a lever element and a coupling element connected thereto, wherein the lever element can be tilted about a third axis via the third flexure bearing, and wherein the coupling element transmits a tilting movement of the lever element into the pivoting movement of the second support via a fourth flexure bearing.

6. The optical element holding device of claim 5, wherein the coupling element comprises a plurality of flexure bearings coupled to one another and having axes oriented orthogonally to one another.

7. The optical element holding device of claim 5, wherein the second actuating element is mounted on the lever element at a distance from the third flexure bearing such that it can perform a relative movement and can be supported at one end against the first support.

8. The optical element holding device of claim 5, further comprising a spring element resetting the tilting movement of the lever element that is between the lever element and the first support.

9. The optical element holding device of claim 1, wherein the first support is prestressed relative to the main support.

10. The optical element holding device of claim 1, wherein at least one of the first and second actuating elements is a ball pressure screw having a fine-pitch thread.

11. The optical element holding device of claim 1, wherein the optical element holding device is monolithic.

12. The optical element holding device of claim 11, wherein the monolithic optical element holding device comprises aluminum.

13. The optical element holding device of claim 1, further comprising predetermined breaking points formed between the supports that can be pivoted and/or tilted relative to one another.

14. The optical element holding device of claim 1, wherein the optical element holding device is configured to hold a reflective optical element.

15. The optical element holding device of claim 1, wherein the optical element holding device is configured to hold a transmissive optical element.

16. The optical element holding device of claim 1, wherein the second support is configured to fasten to only one side of the optical element.

* * * * *

UNITED STATES PATENT AND TRADEMARK OFFICE

CERTIFICATE OF CORRECTION

PATENT NO. : 10,133,024 B2
APPLICATION NO. : 15/130275
DATED : November 20, 2018
INVENTOR(S) : Martin Liermann et al.

It is certified that error appears in the above-identified patent and that said Letters Patent is hereby corrected as shown below:

On the Title Page

Column 1, (72) Inventors, Line 4, delete “Shiltach (DE)” and insert -- Schiltach (DE) --

In the Claims

Column 9, Line 46, in Claim 3, after “device” insert -- of --

Signed and Sealed this
Thirteenth Day of August, 2019

Andrei Iancu
*Director of the United States Patent and Trademark Office*